(12) United States Patent
Husain et al.

(10) Patent No.: US 8,433,508 B2
(45) Date of Patent: Apr. 30, 2013

(54) NAVIGATION SYSTEM WITH MONITORING MECHANISM AND METHOD OF OPERATION THEREOF

(75) Inventors: Aliasgar Mumtaz Husain, Milpitas, CA (US); Hanhong Li, Cupertino, CA (US); Hongwei Feng, Palo Alto, CA (US)

(73) Assignee: Televav, Inc., Sunnyvale, CA (US)

( * ) Notice: Subject to any disclaimer, the term of this patent is extended or adjusted under 35 U.S.C. 154(b) by 622 days.

(21) Appl. No.: 12/609,320

(22) Filed: Oct. 30, 2009

(65) Prior Publication Data

US 2011/0106437 A1 May 5, 2011

(51) Int. Cl.
*G01C 21/00* (2006.01)
*G08B 1/08* (2006.01)

(52) U.S. Cl.
USPC .................. 701/408; 701/417; 340/539.15

(58) Field of Classification Search .......... 701/408, 701/412, 417, 452, 466; 455/456.1, 41.2, 455/404.2; 340/539.15, 572.1, 7.58, 573.4, 340/825.36; 342/357.42, 419
See application file for complete search history.

(56) References Cited

U.S. PATENT DOCUMENTS

| | | | |
|---|---|---|---|
| 4,918,432 A | 4/1990 | Pauley et al. | |
| 5,461,390 A * | 10/1995 | Hoshen | 342/419 |
| 5,867,103 A * | 2/1999 | Taylor, Jr. | 340/573.4 |
| 5,917,414 A | 6/1999 | Oppelt et al. | |
| 6,006,021 A | 12/1999 | Tognazzini | |
| 6,100,806 A * | 8/2000 | Gaukel | 340/573.4 |
| 6,181,253 B1 | 1/2001 | Eschenbach et al. | |
| 6,230,097 B1 | 5/2001 | Dance et al. | |
| 6,232,916 B1 * | 5/2001 | Grillo et al. | 342/357.4 |
| 6,243,039 B1 | 6/2001 | Elliot | |
| 6,351,221 B1 * | 2/2002 | Phillips et al. | 340/8.1 |
| 6,489,893 B1 | 12/2002 | Fullerton et al. | |
| 6,492,906 B1 | 12/2002 | Richards et al. | |
| 6,611,783 B2 | 8/2003 | Kelly, Jr. et al. | |
| 6,674,368 B2 | 1/2004 | Hawkins et al. | |
| 6,850,163 B1 * | 2/2005 | Adamczyk et al. | 340/573.4 |
| 6,983,202 B2 | 1/2006 | Sanqunetti | |
| 7,038,589 B2 | 5/2006 | Schmidt et al. | |
| 7,138,914 B2 | 11/2006 | Culpepper et al. | |
| 7,164,986 B2 | 1/2007 | Humphries et al. | |
| 7,202,814 B2 | 4/2007 | Caspi et al. | |
| 7,340,260 B2 | 3/2008 | McAlexander | |
| 7,353,034 B2 | 4/2008 | Haney | |
| 8,095,070 B2 * | 1/2012 | Twitchell, Jr. | 455/41.2 |
| 2002/0024443 A1 * | 2/2002 | Hawkins et al. | 340/573.1 |
| 2004/0172403 A1 | 9/2004 | Steele et al. | |
| 2004/0225203 A1 | 11/2004 | Jemison et al. | |
| 2005/0068169 A1 | 3/2005 | Copley et al. | |
| 2005/0086261 A1 | 4/2005 | Mammone | |
| 2006/0224303 A1 | 10/2006 | Hayashi | |
| 2006/0229503 A1 | 10/2006 | Fluegel | |
| 2006/0287872 A1 | 12/2006 | Simrell | |
| 2008/0094230 A1 | 4/2008 | Mock et al. | |

OTHER PUBLICATIONS

International Search Report for Application No. PCT/US2010/054933 dated Dec. 28, 2010.

* cited by examiner

*Primary Examiner* — Tan Q Nguyen

(57) ABSTRACT

A method of operation of a navigation system includes: selecting a monitored threshold; selecting a monitored boundary; monitoring a monitored person's traversal of the monitored boundary; and generating an alert based on the monitored person's traversal and the monitored threshold for displaying on a device.

20 Claims, 8 Drawing Sheets

US 8,433,508 B2

NAVIGATION SYSTEM WITH MONITORING MECHANISM AND METHOD OF OPERATION THEREOF

CROSS-REFERENCE TO RELATED APPLICATION

The present application contains subject matter related to concurrently filed U.S. patent application Ser. No. 12/609,347, filed Oct. 30, 2009. The related application is assigned to TeleNav, Inc., and the subject matter thereof is incorporated herein by reference thereto.

TECHNICAL FIELD

The present invention relates generally to a navigation system, and more particularly to a navigation system having monitoring mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide personal safety, personal security, and surveillance features.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigations systems lack features that include monitoring and tracking of people and vehicles. The lack of these features entails security and safety risks. Guardians of children, legal minors, incapacitated adults, senior citizens, and people with mental disabilities lack tools and features to keep them safe.

Thus, a need still remains for a navigation system having monitoring mechanism, providing low cost, improved functionality, and improved reliability. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: selecting a monitored threshold; selecting a monitored boundary; monitoring a monitored person's traversal of the monitored boundary; and generating an alert based on the monitored person's traversal and the monitored threshold for displaying on a device.

The present invention provides a navigation system including: a user interface for selecting a monitored threshold; a boundary module, coupled to the user interface, for selecting a monitored boundary; a monitoring module, coupled to the boundary module, for monitoring a monitored person's traversal of the monitored boundary; and a generate alert module, coupled to the monitoring module, for generating an alert based on the monitored person's traversal and the monitored threshold for displaying on a device.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
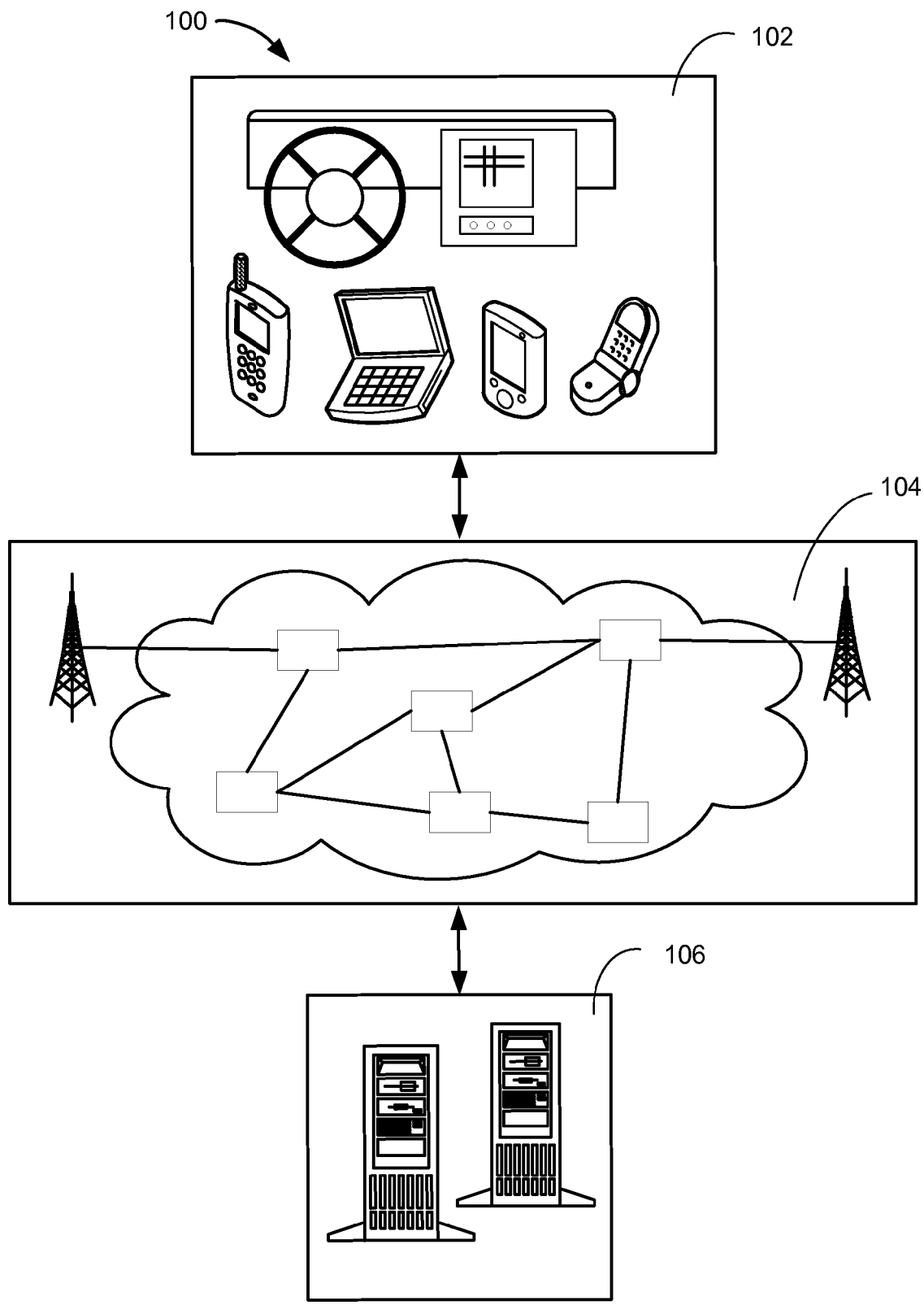
FIG. 1 is a navigation system with monitoring mechanism in a first embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "monitored person" referred to herein, can include an underage child, an incapacitated adult, senior citizen, person with mental disabilities, legal ward, prisoner, criminal, and parolee. A monitored person can have a parent or guardian that is legally responsible for the monitored person. A ward is someone placed under the protection of a legal guardian.

The term "criteria" referred to herein, can include rules or conditions that can affect the actions of the navigation system. The criteria can be user-defined rules, standards, or conditions. For example, when a criterion is met, exceeded, broken, or violated, the navigation system can generate an alert for display on a screen. The criteria can be user-defined or assigned by the navigation system.

Referring now to FIG. 1, therein is shown a navigation system 100 with monitoring mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid-computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. The second device 106 can also be a mobile device and can communicate with the first device 102 through peer-to-peer communication.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
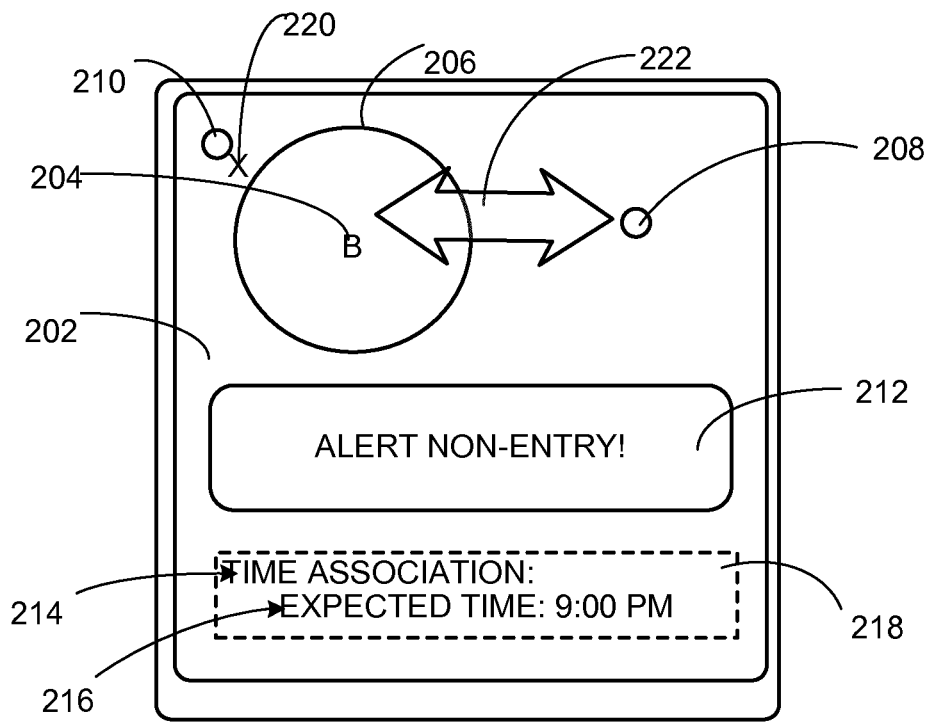
FIG. 2 is a first example of a display interface of the first device.

Referring now to FIG. 2, therein is shown a first example of a display interface 202 of the first device 102. The display interface 202 can depict a boundary center location 204, a monitored boundary 206, a first tracking tag 208, a second tracking tag 210, an alert 212, a time association 214, an expected time 216, a monitored threshold 218, a non-entry 220, and a monitored person's traversal 222 through the monitored boundary 206.

The display interface 202 can depict a screen shot of a navigation device that can monitor a monitored person. For example, the first tracking tag 208 can represent a monitored person that a parent, guardian, or supervisor wishes to monitor. The second tracking tag 210 can represent a different monitored person, such as a second child, senior citizen, incapacitated adult, or prisoner under supervision.

The monitored person can be holding or wearing a device that emits the first tracking tag 208, such as a global positioning system (GPS) signal or a cellular signal for triangulation. For example, this device can be the first device 102 or a tracking bracelet. The first tracking tag 208 can be monitored and tracked on the display interface 202.

The monitored boundary 206 can represent a specific geographic region to be monitored. The monitored boundary 206 can also represent a user-defined region depicted on the display interface 202. The monitored boundary 206 can be configured to cover a user-defined shape. The monitored boundary 206 can be a circle, a square, or a polygon. For example, the monitored boundary 206 can be customized to cover the contours of a house.

The boundary center location 204 can be used to define the monitored boundary 206. The boundary center location 204 can represent a center point of the monitored boundary 206. The boundary center location 204 can be set by selecting a tracking signal, an address, cross streets, or longitude and latitude coordinates. For example, the boundary center location 204 can be set as an address to a house. The monitored boundary 206 can represent a region around the house to be monitored.

The perimeter of the monitored boundary 206 can be configured by selecting a radial distance from the boundary center location 204. For example, the monitored boundary 206 can be selected as a 25-foot radius or a 10-meter radius around the house. The monitored boundary 206 can be stationary or non-stationary.

For example, the source of a tracking signal can be selected as the boundary center location 204. The monitored boundary 206 can move as the boundary center location 204 moves. If a cellular phone is selected as the boundary center location 204, the monitored boundary 206 can represent the region around the cell phone as a person carries the cell phone.

The alert 212 can represent a warning if the person being tracked has not met requirements associated with the monitored boundary 206. The alert 212 can be implemented in a number of ways. For example, the alert 212 can be a pop up message on the display interface 202. The alert 212 can also be an audio alarm. The alert 212 can occur based on user-defined criteria, rules, or conditions.

The monitored threshold 218 can represent criteria that can trigger the generation of the alert 212. On the display interface 202, the monitored threshold 218 can be depicted as informational text displaying the criteria. The monitored threshold 218 can display the selected criteria that can generate the alert 212 such as the time association 214. The monitored threshold 218 can be based on different criteria in addition to the time association 214. Other examples of the monitored threshold 218 will be explained in greater detail below.

The time association 214 can represent one type of the monitored threshold 218 that can generate the alert 212 based on time. For example, the time association 214 can be selected to a specific time, a time limit, a time countdown, or a combination thereof. If a criteria or rule is violated for the time association 214, the alert 212 can be generated. The time association 214 can be displayed on the display interface 202 as text. The time association 214 can include the expected time 216 as a criterion in generating the alert 212.

The expected time 216 can represent a user-defined time that the first tracking tag 208 must be inside or outside the monitored boundary 206. If the criteria associated with the expected time 216 are not met, the alert 212 can be generated.

For example, the monitored or the parent can select the expected time 216 to be 9:00 PM where a monitored person must be inside the monitored boundary 206. If the monitored person represented by the first tracking tag 208 is not within the monitored boundary 206 at or by 9:00 PM, the alert 212 can be generated. If the first tracking tag 208 is in the monitored boundary 206 by the expected time 216, the alert 212 will not be generated.

In addition, the supervisor, the guardian, or the parent can select that the monitored person must be outside the monitored boundary 206 by the expected time 216. The expected time 216 can represent one type of the time association 214. The other examples of the time association 214 will be explained below.

The non-entry 220 into the monitored boundary 206 can occur when a monitored person is not in the monitored boundary 206 by the expected time 216. The display interface 202 can represent the non-entry 220 as an "X" on the screen. If the non-entry 220 occurs, the alert 212 can be generated. For example, if the second tracking tag 210 remains outside the monitored boundary 206 by 9:00 pm, the alert 212 can be generated.

The monitored person's traversal 222 can represent when a monitored person crosses the monitored boundary 206. The monitored person's traversal 222 can represent an entry into the monitored boundary 206 or an exit out of the monitored boundary 206. For example, the monitored person's traversal 222 can include the first tracking tag 208 entering into the monitored boundary 206 or the first tracking tag 208 leaving the monitored boundary 206. The alert 212 can be generated based on detecting the monitored person's traversal 222.

Figure 3:
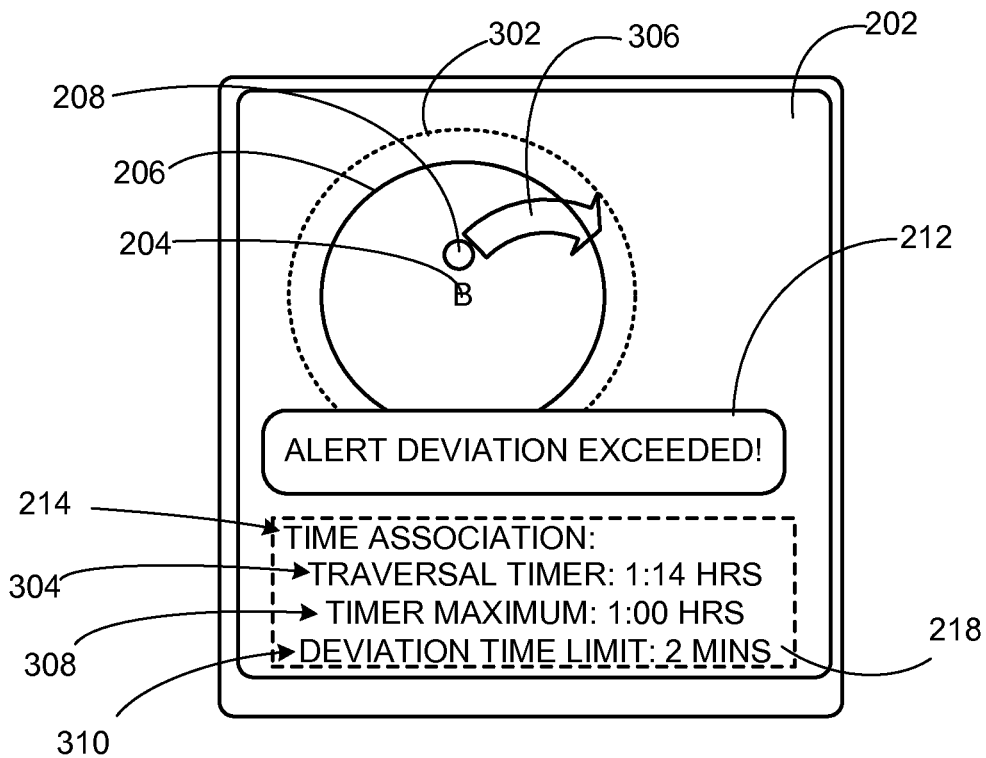
FIG. 3 is a second example of the display interface.

Referring now to FIG. 3, therein is shown a second example of the display interface 202. The display interface 202 can depict the first tracking tag 208, the boundary center location 204, the monitored boundary 206, the alert 212, the time association 214, and the monitored threshold 218. The display interface 202 can also depict a deviation boundary 302, a traversal timer 304, a monitored person's exit traversal 306, a timer maximum 308, and a deviation time limit 310.

The display interface 202 can depict the first tracking tag 208 moving out of the monitored boundary 206. The monitored person's exit traversal 306 can represent the first tracking tag 208 exiting out of the monitored boundary 206. The monitored person's exit traversal 306 can also represent the first tracking tag 208 exiting out of the deviation boundary 302. The monitored person's exit traversal 306 can represent one type of the monitored person's traversal 222 of FIG. 2.

The deviation boundary 302 can represent a second user-defined boundary for monitoring the first tracking tag 208. The deviation boundary 302 can be similar to the monitored boundary 206. The deviation boundary 302 can allow for more criteria and thus more flexibility before generating the alert 212. For example, the alert 212 can be generated if the first tracking tag 208 leaves the monitored boundary 206. The deviation boundary 302 can be selected to allow for short trips outside the monitored boundary 206 without generating the alert 212.

FIG. 3 depicts more examples of the time association 214. The time association 214 can include the traversal timer 304, the timer maximum 308, and the deviation time limit 310.

The traversal timer 304 can represent a timer that can begin when the first tracking tag 208 crosses the monitored boundary 206. For example, the traversal timer 304 can begin counting time when the monitored person's exit traversal 306 occurs.

The timer maximum 308 can represent the maximum amount of time before generate the alert 212 that is associated with the traversal timer 304. For example, the timer maximum 308 can represent selecting a maximum time amount before the alert 212 can be generated. The alert 212 can be generated if the traversal timer 304 meets or exceeds the timer maximum 308.

On the display interface 202, the traversal timer 304 is shown as one hour and fourteen minutes and counting upwards. The timer maximum 308 can be set to a one hour. The alert 212 can be generated when the traversal timer 304 equals one hour because the traversal timer 304 meeting the timer maximum 308. The alert 212 will not be generated if the first tracking tag 208 returns within the monitored boundary 206 before the timer maximum 308.

The traversal timer 304 can also monitor the monitored person's traversal 222 of FIG. 2 inside the monitored boundary 206. The traversal timer 304 can be configured to count time when the first tracking tag 208 is inside the monitored boundary 206. The timer maximum 308 can be selected to generate the alert 212 when the first tracking tag 208 has been inside the monitored boundary 206 for a certain amount of time.

The first tracking tag 208 can represent a monitored person, and the monitored boundary 206 can represent a region that covers a house. The deviation boundary 302 can be set to include a region that is ten yards or ten meters away from the monitored boundary 206. The alert 212 can be generated if there is the monitored person's exit traversal 306 beyond the deviation boundary 302.

For example, a parent might allow a child to go to the mailbox or play in the front yard of the house for a short period of time. The monitored boundary 206 can be selected as the perimeter of a house and the deviation boundary 302 can be selected as ten yards or ten meters away from the monitored boundary 206. If the child wonders beyond the deviation boundary 302, the alert 212 can be generated.

The deviation time limit 310 can represent the time limit before generating the alert 212 for the deviation boundary 302. The alert 212 can be generated if the monitored person violates the deviation time limit 310 while inside the deviation boundary 302. For example, the deviation time limit 310 can be assigned to two minutes. If the monitored person travels into the deviation boundary 302 and returns to the monitored boundary 206 within two minutes, the alert 212 will not be generated. If the monitored person remains in the deviation boundary 302 beyond two minutes or exits out of the deviation boundary 302, the alert 212 can be generated.

Figure 4:
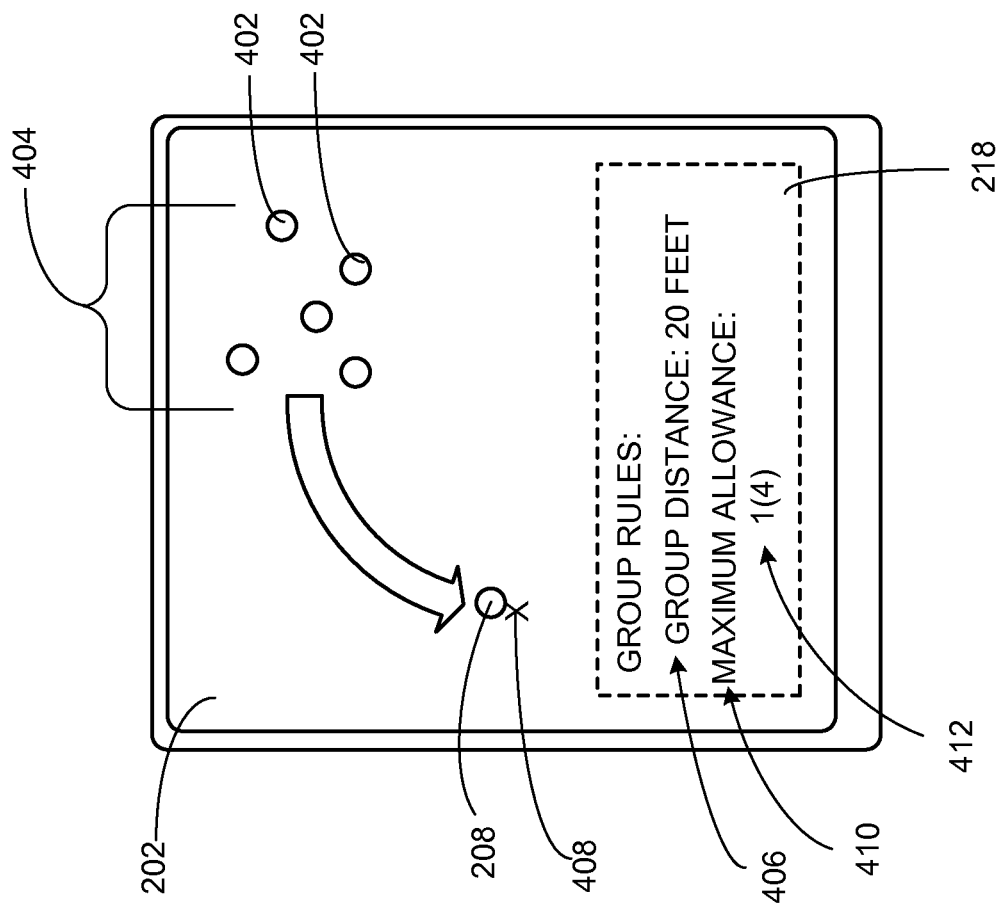
FIG. 4 is a third example of the display interface.

Referring now to FIG. 4, therein is shown a third example of the display interface 202. The display interface 202 can depict the first tracking tag 208 and the monitored threshold 218 of FIG. 2. The display interface 202 can depict a group membership 402, a group association 404, a group distance 406, a monitored person's location 408, a maximum allowance 410, and an allowance count 412.

The group membership 402 can represent individual tracking signals that form the group association 404. The group membership 402 can represent friends of the monitored person being tracked or chaperons of the group. The group association 404 can represent a user-defined collection of the group membership 402. For example, the supervisor, the guardian, the parent, or even one of the chaperons can create the group association 404 by assigning the group membership 402 to each person in a group, such as a soccer team or attendees of a birthday party.

The alert 212 can be generated based on proximity of the first tracking tag 208 to the group association 404. The alert 212 can be generated if the first tracking tag 208 is too far away or two close to the group association 404. For example, a parent can receive the alert 212 when the first tracking tag 208 approaches the group association 404 and another alert when the first tracking tag 208 moves away from the group association 404.

The alert 212 based on the group association 404 can be triggered when the first tracking tag 208 interacts with two or more members of the group association 404. For example, if the first tracking tag 208 remains near two of more of the group membership 402, then the alert 212 will not be generated. This situation can represent the first tracking tag 208 remaining with a group. As long as the first tracking tag 208 remains near two or more of the group membership 402, the alert 212 will not be generated even if the group is moving.

If the group association 404 disbands, the alert 212 can be generated. Thus, if the first tracking tag 208 and one of the group membership 402 wander away from the group association 404, the alert 212 can be generated. The first tracking tag 208 is no longer associated with two or more of the group membership 402.

The group distance 406 can represent a distance between the first tracking tag 208 and with the group association 404 for generating the alert 212. The group distance 406 can be configured to generate the alert 212 in two situations. In the first situation, the alert 212 can be generated when the first tracking tag is within the group distance 406. For example, the group distance 406 can be twenty yards or twenty meters. If the first tracking tag 208 is within twenty meters of the group association 404, the alert 212 can be generated.

In the second situation, the alert 212 can be generated when the first tracking tag 208 is beyond the group distance 406. For example, the alert 212 can be generated if the first tracking tag 208 moves twenty meters away from the group association 404.

The monitored person's location 408 can represent a location of the first tracking tag 208. The monitored person's location 408 can be used to measure the distance from the first tracking tag 208 to the group association 404. If the monitored person's location 408 exceeds the group distance 406, the alert 212 can be generated.

The maximum allowance 410 can represent a threshold amount of times the monitored threshold 218 can be violated or met before generating the alert 212. The maximum allowance 410 can be assigned to a reoccurring time period such as a day, a week, a month, a year or combination thereof. For example, the maximum allowance 410 can be set to four violations per week. If the monitored threshold 218 that is associated with the maximum allowance 410 is violated four times in that week, the alert 212 can be generated.

The maximum allowance 410 can be associated with the different types of the monitored threshold 218. The maximum allowance 410 can be associated with the non-entry 220 of FIG. 2, the monitored person's traversal 222 of FIG. 2, the traversal timer 304 of FIG. 3, the group association 404, or a combination thereof. For example, the maximum allowance 410 can be assigned to allowing four of the non-entry 220 to occur in a week before generating the alert 212.

The allowance count 412 can represent the number of occurrences of a violation of the monitored threshold 218 for the maximum allowance 410. If the allowance count 412 meets or exceeds the maximum allowance 410, the alert 212 can be generated. The allowance count 412 can be reset per the time period associated with the maximum allowance 410. If the maximum allowance is assigned to a week period, the allowance count 412 can be reset each week.

Figure 5:
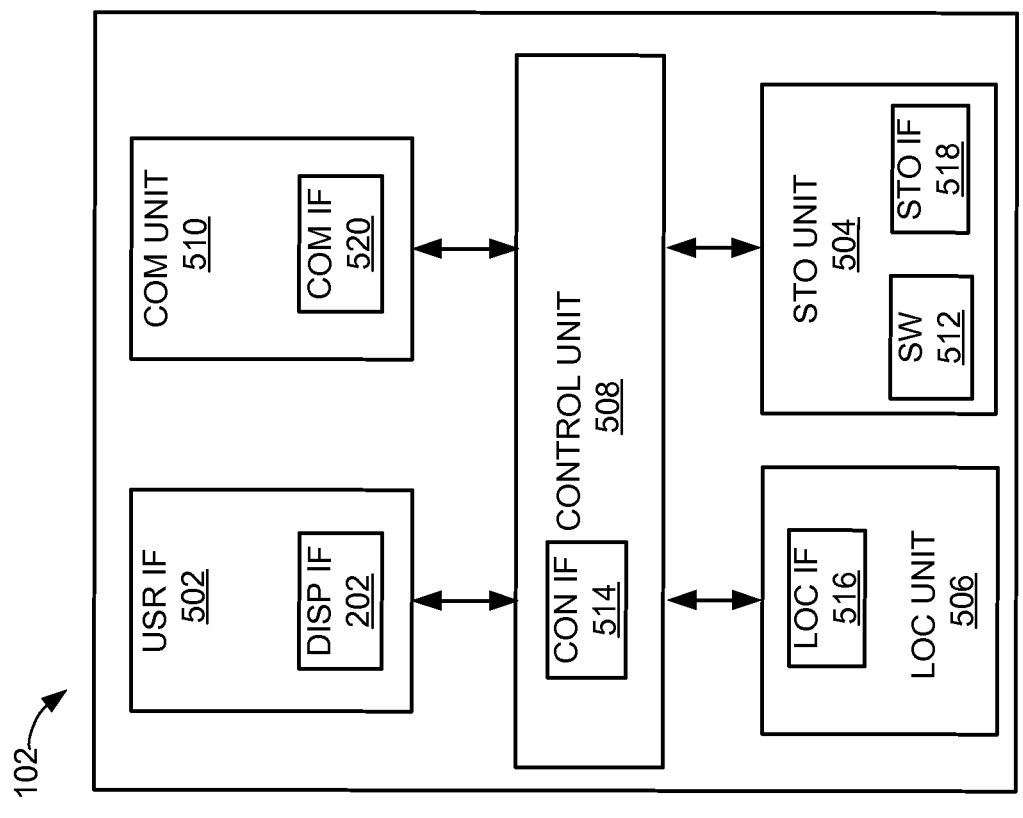
FIG. 5 is an exemplary block diagram of the first device.

Referring now to FIG. 5, therein is shown an exemplary block diagram of the first device 102. The first device 102 can include a user interface 502, a storage unit 504, a location unit 506, a control unit 508, and a communication unit 510.

The user interface 502 allows a user (not shown) to interface and interact with the first device 102. The user interface 502 can include an input device and an output device. Examples of the input device of the user interface 502 can include a keypad, a touchpad, soft-keys, a keyboard, a microphone, or any combination thereof to provide data and communication inputs. Examples of the output device of the user interface 502 can include the display interface 202. The display interface 202 can include a display, a projector, a video screen, a speaker, or any combination thereof.

The control unit 508 can execute a software 512 to provide the intelligence of the navigation system 100. The control unit 508 can operate the user interface 502 to display information generated by the navigation system 100. The control unit 508 can also execute the software 512 for the other functions of the navigation system 100, including receiving location information from the location unit 506. The control unit 508 can further execute the software 512 for interaction with the communication path 104 of FIG. 1 via the communication unit 510.

The control unit 508 can be implemented in a number of different manners. For example, the control unit 508 can be a processor, an embedded processor, a microprocessor, a hardware control logic, a hardware finite state machine (FSM), a digital signal processor (DSP), or a combination thereof.

The control unit 508 can include a controller interface 514. The controller interface 514 can be used for communication between the control unit 508 and other functional units in the first device 102. The controller interface 514 can also be used for communication that is external to the first device 102.

The controller interface 514 can receive information from the other functional units or from external sources, or can transmit information to the other functional units or to external destinations. The external sources and the external destinations refer to sources and destinations external to the first device 102.

The controller interface 514 can be implemented in different ways and can include different implementations depending on which functional units or external units are being interfaced with the controller interface 514. For example, the controller interface 514 can be implemented with a pressure sensor, an inertial sensor, a micro-electromechanical system (MEMS), optical circuitry, waveguides, wireless circuitry, wireline circuitry, or a combination thereof.

The location unit 506 can generate location information, current heading, and current speed of the first device 102, as examples. The location unit 506 can be implemented in many ways. For example, the location unit 506 can function as at least a part of a global positioning system (GPS), an inertial navigation system, a cell-tower location system, a pressure location system, or any combination thereof.

The location unit 506 can include a location interface 516. The location interface 516 can be used for communication between the location unit 506 and other functional units in the first device 102. The location interface 516 can also be used for communication that is external to the first device 102.

The location interface 516 can receive information from the other functional units or from external sources, or can transmit information to the other functional units or to external destinations. The external sources and the external destinations refer to sources and destinations external to the first device 102.

The location interface 516 can include different implementations depending on which functional units or external units are being interfaced with the location unit 506. The location interface 516 can be implemented with technologies and techniques similar to the implementation of the controller interface 514.

The storage unit 504 can store the software 512. The storage unit 504 can also store the relevant information, such as advertisements, points of interest (POI), navigation routing entries, or any combination thereof.

The storage unit 504 can be a volatile memory, a nonvolatile memory, an internal memory, an external memory, or a combination thereof. For example, the storage unit 504 can be a nonvolatile storage such as non-volatile random access memory (NVRAM), Flash memory, disk storage, or a volatile storage such as static random access memory (SRAM).

The storage unit 504 can include a storage interface 518. The storage interface 518 can be used for communication between the location unit 506 and other functional units in the first device 102. The storage interface 518 can also be used for communication that is external to the first device 102.

The storage interface 518 can receive information from the other functional units or from external sources, or can transmit information to the other functional units or to external destinations. The external sources and the external destinations refer to sources and destinations external to the first device 102.

The storage interface 518 can include different implementations depending on which functional units or external units are being interfaced with the storage unit 504. The storage interface 518 can be implemented with technologies and techniques similar to the implementation of the controller interface 514.

The communication unit 510 can enable external communication to and from the first device 102. For example, the communication unit 510 can permit the first device 102 to communicate with the second device 106 of FIG. 1, an attachment, such as a peripheral device or a computer desktop, and the communication path 104.

The communication unit 510 can also function as a communication hub allowing the first device 102 to function as part of the communication path 104 and not limited to be an end point or terminal unit to the communication path 104. The communication unit 510 can include active and passive components, such as microelectronics or an antenna, for interaction with the communication path 104.

The communication unit 510 can include a communication interface 520. The communication interface 520 can be used for communication between the communication unit 510 and other functional units in the first device 102. The communication interface 520 can receive information from the other functional units or can transmit information to the other functional units.

The communication interface 520 can include different implementations depending on which functional units are being interfaced with the communication unit 510. The communication interface 520 can be implemented with technologies and techniques similar to the implementation of the controller interface 514.

For illustrative purposes, the navigation system 100 is shown with the partition having the user interface 502, the storage unit 504, the location unit 506, the control unit 508, and the communication unit 510 although it is understood that the navigation system 100 can have a different partition. For example, the software 512 can be partitioned differently such that some or all of its function can be in the control unit 508, the location unit 506, and the communication unit 510. Also, the first device 102 can include other functional units not shown in FIG. 5 for clarity.

The functional units in the first device 102 can work individually and independently of the other functional units. The first device 102 can work individually and independently from the second device 106 and the communication path 104.

Figure 6:
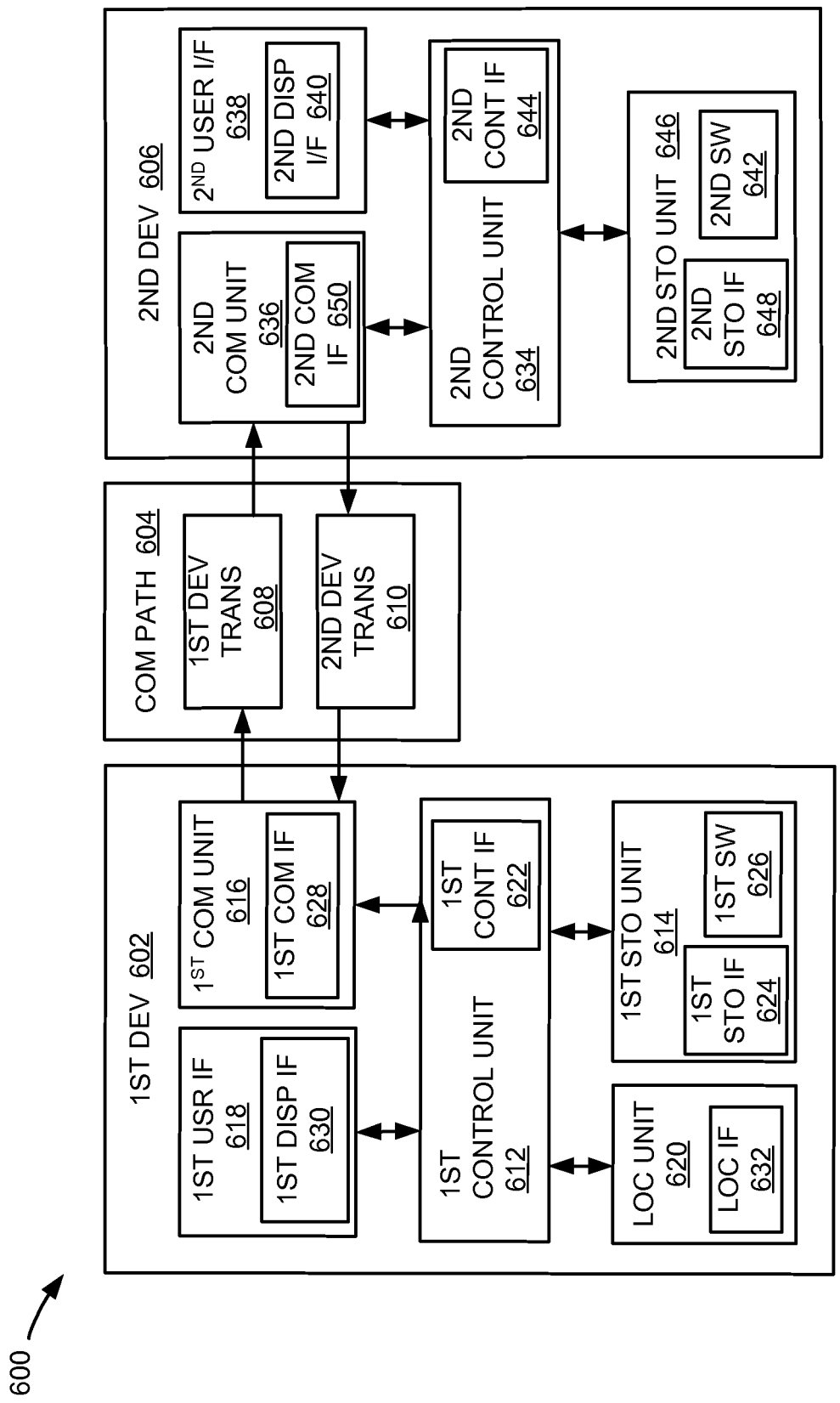
FIG. 6 is an exemplary block diagram of a navigation system having monitoring mechanism in a second embodiment of the present invention.

Referring now to FIG. 6, therein is shown an exemplary block diagram of a navigation system 600 having monitoring mechanism in a second embodiment of the present invention. The navigation system 600 can include a first device 602, a communication path 604, and a second device 606.

The first device 602 can communicate with the second device 606 over the communication path 604. For example, the first device 602, the communication path 604, and the second device 606 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 600.

The first device 602 can send information in a first device transmission 608 over the communication path 604 to the second device 606. The second device 606 can send information in a second device transmission 610 over the communication path 604 to the first device 602.

For illustrative purposes, the navigation system 600 is shown with the first device 602 as a client device, although it is understood that the navigation system 600 can have the first device 602 as a different type of device. For example, the first device 602 can be a server.

Also for illustrative purposes, the navigation system 600 is shown with the second device 606 as a server, although it is understood that the navigation system 600 can have the second device 606 as a different type of device. For example, the second device 606 can be a client device.

For brevity of description in this embodiment of the present invention, the first device 602 will be described as a client device and the second device 606 will be described as a server device. The present invention is not limited to this selection for the type of devices. The selection is an example of the present invention.

The first device 602 can include a first control unit 612, a first storage unit 614, a first communication unit 616, a first user interface 618, and a location unit 620. The first device 602 can be similarly described by the first device 102.

The first control unit 612 can include a first control interface 622. The first control unit 612 and the first control interface 622 can be similarly described as the control unit 508 of FIG. 5 and the controller interface 514 of FIG. 5, respectively.

The first storage unit 614 can include a first storage interface 624. The first storage unit 614 and the first storage interface 624 can be similarly described as the storage unit 504 of FIG. 5 and the storage interface 518 of FIG. 5, respectively. A first software 626 can be stored in the first storage unit 614.

The first communication unit 616 can include a first communication interface 628. The first communication unit 616 and the first communication interface 628 can be similarly described as the communication unit 510 of FIG. 5 and the communication interface 520 of FIG. 5, respectively.

The first user interface 618 can include a first display interface 630. The first user interface 618 and the first display interface 630 can be similarly described as the user interface 502 of FIG. 5 and the display interface 202 of FIG. 3, respectively.

The location unit 620 can include a location interface 632. The location unit 620 and the location interface 632 can be similarly described as the location unit 506 of FIG. 5 and the location interface 516 of FIG. 5, respectively.

The performance, architectures, and type of technologies can also differ between the first device 102 and the first device 602. For example, the first device 102 can function as a single device embodiment of the present invention and can have a higher performance than the first device 602. The first device 602 can be similarly optimized for a multiple device embodiment of the present invention.

For example, the first device 102 can have a higher performance with increased processing power in the control unit 508 compared to the first control unit 612. The storage unit 504 can provide higher storage capacity and access time compared to the first storage unit 614.

Also for example, the first device 602 can be optimized to provide increased communication performance in the first communication unit 616 compared to the communication unit 510. The first storage unit 614 can be sized smaller compared to the storage unit 504. The first software 626 can be smaller than the software 512 of FIG. 5.

The second device 606 can be optimized for implementing the present invention in a multiple device embodiment with the first device 602. The second device 606 can provide the additional or higher performance processing power compared to the first device 602. The second device 606 can include a second control unit 634, a second communication unit 636, and a second user interface 638.

The second user interface 638 allows a user (not shown) to interface and interact with the second device 606. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the navigation system 600. The second software 642 can operate in conjunction with the first software 626. The second control unit 634 can provide additional performance compared to the first control unit 612 or the control unit 508.

The second control unit 634 can operate the second user interface 638 to display information. The second control unit 634 can also execute the second software 642 for the other functions of the navigation system 600, including operating the second communication unit 636 to communicate with the first device 602 over the communication path 604.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 606. The second controller interface 644 can also be used for communication that is external to the second device 606.

The second controller interface 644 can receive information from the other functional units or from external sources, or can transmit information to the other functional units or to external destinations. The external sources and the external destinations refer to sources and destinations external to the second device 606.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 600 is shown with the second storage unit 646 as a single hierarchy storage system, although it is understood that the navigation system 600 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as nonvolatile random access memory (NVRAM), Flash memory, disk storage, or a volatile storage such as static random access memory (SRAM).

The second storage unit 646 can include a second storage interface 648. The second storage interface 648 can be used for communication between the location unit 506 and other functional units in the second device 606. The second storage interface 648 can also be used for communication that is external to the second device 606.

The second storage interface 648 can receive information from the other functional units or from external sources, or can transmit information to the other functional units or to external destinations. The external sources and the external destinations refer to sources and destinations external to the second device 606.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 606. For example, the second communication unit 636 can permit the second device 606 to communicate with the first device 602 over the communication path 604.

The second communication unit 636 can also function as a communication hub allowing the second device 606 to function as part of the communication path 604 and not limited to be an end point or terminal unit to the communication path 604. The second communication unit 636 can include active and passive components, such as microelectronics or an antenna, for interaction with the communication path 604.

The second communication unit 636 can include a second communication interface 650. The second communication interface 650 can be used for communication between the second communication unit 636 and other functional units in the second device 606. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 604 to send information to the second device 606 in the first device transmission 608. The second device 606 can receive information in the second communication unit 636 from the first device transmission 608 of the communication path 604.

The second communication unit 636 can couple with the communication path 604 to send information to the first device 602 in the second device transmission 610. The first device 602 can receive information in the first communication unit 616 from the second device transmission 610 of the communication path 604. The navigation system 600 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 606 can include other functional units not shown in FIG. 6 for clarity.

The functional units in the first device 602 can work individually and independently of the other functional units. The first device 602 can work individually and independently from the second device 606 and the communication path 604.

The functional units in the second device 606 can work individually and independently of the other functional units. The second device 606 can work individually and independently from the first device 602 and the communication path 604.

For illustrative purposes, the navigation system 600 is described by operation of the first device 602 and the second device 606. It is understood that the first device 602 and the second device 606 can operate any of the modules and functions of the navigation system 600. For example, the first device 602 is described to operate the location unit 620, although it is understood that the second device 606 can also operate the location unit 620.

Figure 7:
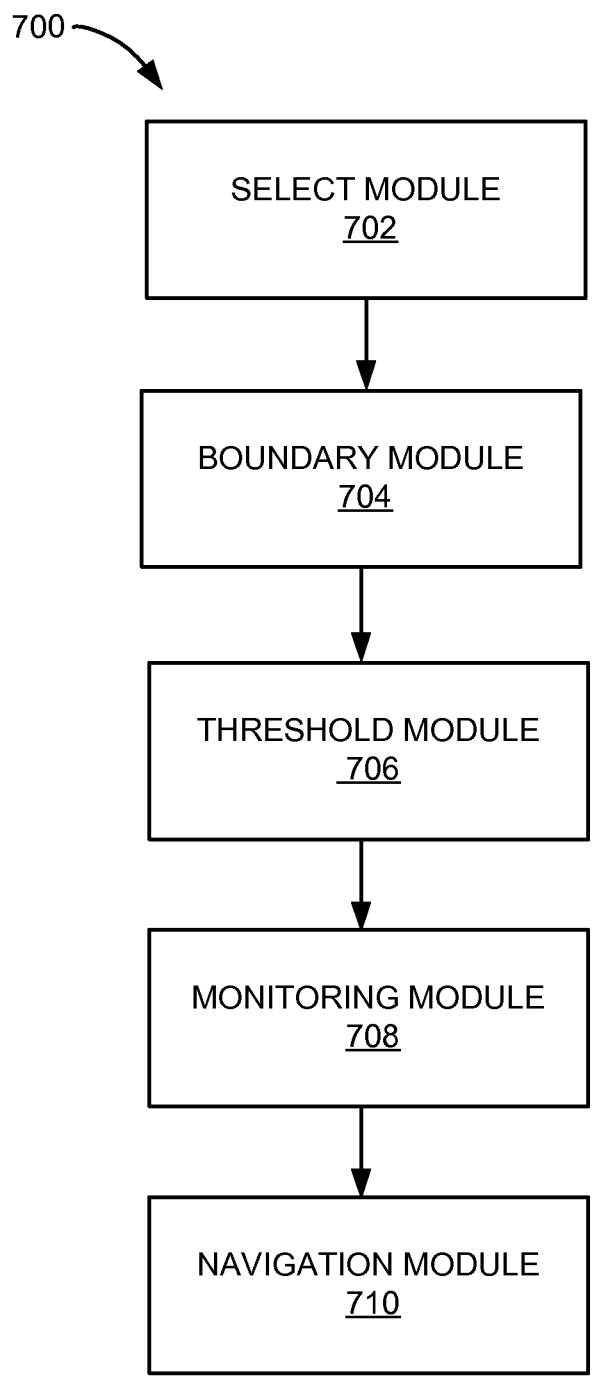
FIG. 7 is a navigation system having monitoring mechanism in a third embodiment of the present invention.

Referring now to FIG. 7, therein is shown a navigation system 700 having monitoring mechanism in a third embodiment of the present invention. The navigation system 700 can include a select module 702, a boundary module 704, a threshold module 706, a monitoring module 708, and a navigation module 710.

The select module 702 can allow the selection of the first tracking tag 208 of FIG. 2, the second tracking tag 210 of FIG. 2, and the group membership 402 of FIG. 4. The selection can be user-initiated or automatically selected by the navigation system 700.

For example, the select module 702 can prompt the user for the tracking signal information for the first tracking tag 208, the second tracking tag 210, and the group membership 402. The select module 702 can use the user interface 502 of FIG. 5 to allow user selection. The select module 702 can also use the first user interface 618 of FIG. 6 to allow user selection.

The boundary module 704 can allow the user to customize the size and shape of the monitored boundary 206, the deviation boundary 302 of FIG. 3, or the combination thereof. The selection can be user-initiated or automatically selected by the navigation system 700.

The boundary module 704 can allow the selection of the boundary center location 204 and the monitored boundary 206 of FIG. 2. The boundary module 704 can also allow the selection of the deviation boundary 302. The boundary module 704 can use the user interface 502 of FIG. 5 to allow user selection. The boundary module 704 can also use the first user interface 618 of FIG. 6 to allow user selection.

The threshold module 706 can select the monitored threshold 218 of FIG. 2 for generating the alert 212 of FIG. 2. The selection can be user-initiated or automatically selected by the first device 102. The threshold module 706 can select the group association 404 of FIG. 4, the time association 214 of FIG. 2, or a combination thereof.

The threshold module 706 can use the user interface 502 of FIG. 5 to allow user selection. The threshold module 706 can also use the first user interface 618 of FIG. 6 to allow user selection. The threshold module 706 will be explained in greater detail below.

The monitoring module 708 can monitor the first tracking tag 208, the monitored boundary 206, the monitored threshold 218 of FIG. 2, or the combination thereof. The monitoring module 708 can use the location unit 506 of FIG. 5, the communication unit 510 of FIG. 5, the control unit 508 of FIG. 5, or a combination thereof to monitor the first tracking tag 208. The monitoring module 708 can also use the location unit 620 of FIG. 6, the first communication unit 616 of FIG. 6, the first control unit 612 of FIG. 6, the second control unit 634 of FIG. 6, or the combination thereof to monitor the first tracking tag 208. The monitoring module 708 will be explained in greater detail below.

The navigation module 710 can generate and display routes to the first tracking tag 208, the second tracking tag 210, and the group membership 402. For example, if the first device 102 of FIG. 1 received the alert 212 of FIG. 2, the navigation module 710 can generate a route from the first device 102 to the first tracking tag 208. Thus, a parent can follow the route to the monitored person, such as a parent's child.

The navigation module 710 can use the control unit 508, the communication unit 510, and the location unit 506 to generate routes to the first tracking tag 208. The navigation module 710 can use the display interface 202 of FIG. 2 to display the route. The navigation module 710 can also use the first control unit 612, the first communication unit 616, and the location unit 620 of FIG. 6 to generate routes to the first tracking tag 208. The navigation module 710 can use the first display interface 630 of FIG. 6 to display the route.

The navigation system 700 can be partitioned between the first device 602 of FIG. 6 and the second device 606 of FIG. 6. For example, the navigation system 700 can be partition into the functional units of the first device 602, the second device 606, or a combination thereof. The navigation system 700 can also be implemented as additional functional units in the first device 102 of FIG. 5, the first device 602, the second device 606, or a combination thereof.

The select module 702 can be coupled to the boundary module 704. The boundary module 704 can be coupled to the threshold module 706. The threshold module 706 can be coupled to the monitoring module 708. The monitoring module 708 can be coupled to the navigation module 710.

The navigation system 700 describes the module functions or order as an example. The modules can be partitioned differently. For example, the boundary module 704 through the monitoring module 708 can be implemented as one module or with lesser number of modules. Each of the modules can operate individually and independently of the other modules.

Figure 8:
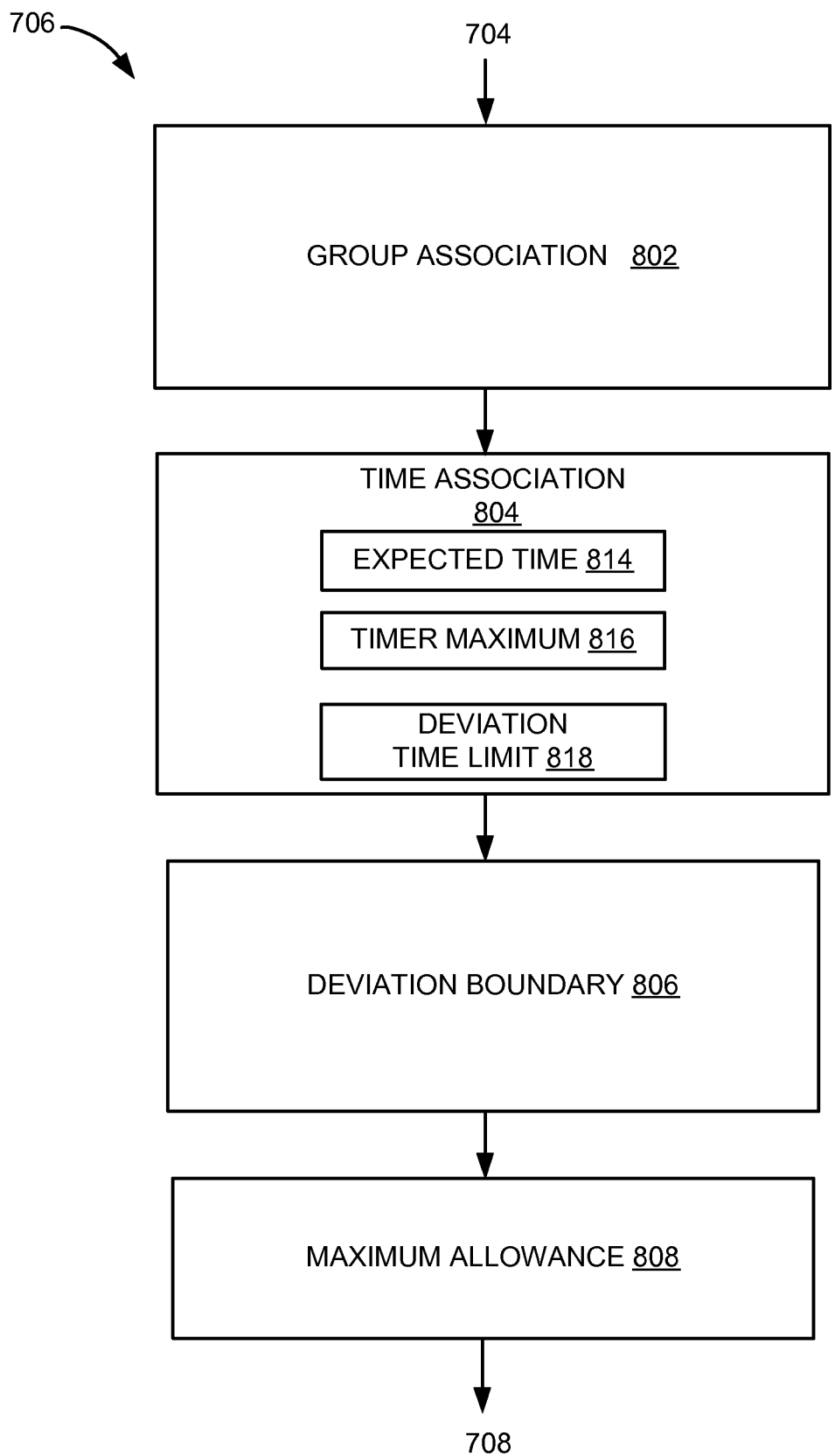
FIG. 8 is a detailed view of the threshold module.

Referring now to FIG. 8, therein is shown a detailed view of the threshold module 706. The threshold module 706 can include a group association module 802, a time association module 804, a deviation boundary module 806, and a maximum allowance module 808.

The group association module 802 can allow the selection of the group membership 402 of FIG. 4, the group distance 406 of FIG. 4, the group association 404 of FIG. 4, or a combination thereof. The selection can be user-initiated or automatically selected by the navigation system 700.

The group association module 802 can use the user interface 502 of FIG. 5 to make selections. The group association module 802 can also use the first user interface 618 of FIG. 6 to make selections.

The time association module 804 can allow the selection of the time association 214 of FIG. 2. The selection can be user-initiated or automatically selected by the navigation system 700. The time association module 804 can include an expected time module 814, a timer maximum module 816, and a deviation time limit module 818.

The expected time module 814 can allow the selection of the expected time 216 of FIG. 2. The timer maximum module 816 can allow the selection of the timer maximum 308 of FIG. 3. The deviation time limit module 818 can allow the selection of the deviation time limit 310 of FIG. 3.

The expected time module 814, the timer maximum module 816, and the deviation time limit module 818 can use the user interface 502 to make selections. The expected time module 814, the timer maximum module 816, and the deviation time limit module 818 can also use the first user interface 618 to make selections.

The deviation boundary module 806 can allow the selection of the deviation boundary 302 of FIG. 3. The selection can be user-initiated or automatically selected by the first device 102. The deviation boundary module 806 can use the user interface 502 to make selections. The deviation boundary module 806 can also use the first user interface 618 to make selections.

The maximum allowance module 808 can allow the selection of the maximum allowance 410 of FIG. 4. The selection can be user-initiated or automatically selected by the navigation system 700. The maximum allowance module 808 can use the user interface 502 to make selections. The maximum allowance module 808 can also use the first user interface 618 to make selections.

The group association module 802 can be coupled to the time association module 804. The time association module 804 can be coupled to the deviation boundary module 806. The deviation boundary module 806 can be coupled to the maximum allowance module 808.

For illustrative purposes, the modules of the threshold module 706 are described as discrete functional modules, although it is understood that these modules can have a different configuration. For example, the group association module 802, the time association module 804, the deviation boundary module 806, the maximum allowance module 808, the expected time module 814, the timer maximum module 816, and the deviation time limit module 818 may not be discrete functional modules but may have one or more of the aforementioned modules combined into one functional module.

Figure 9:
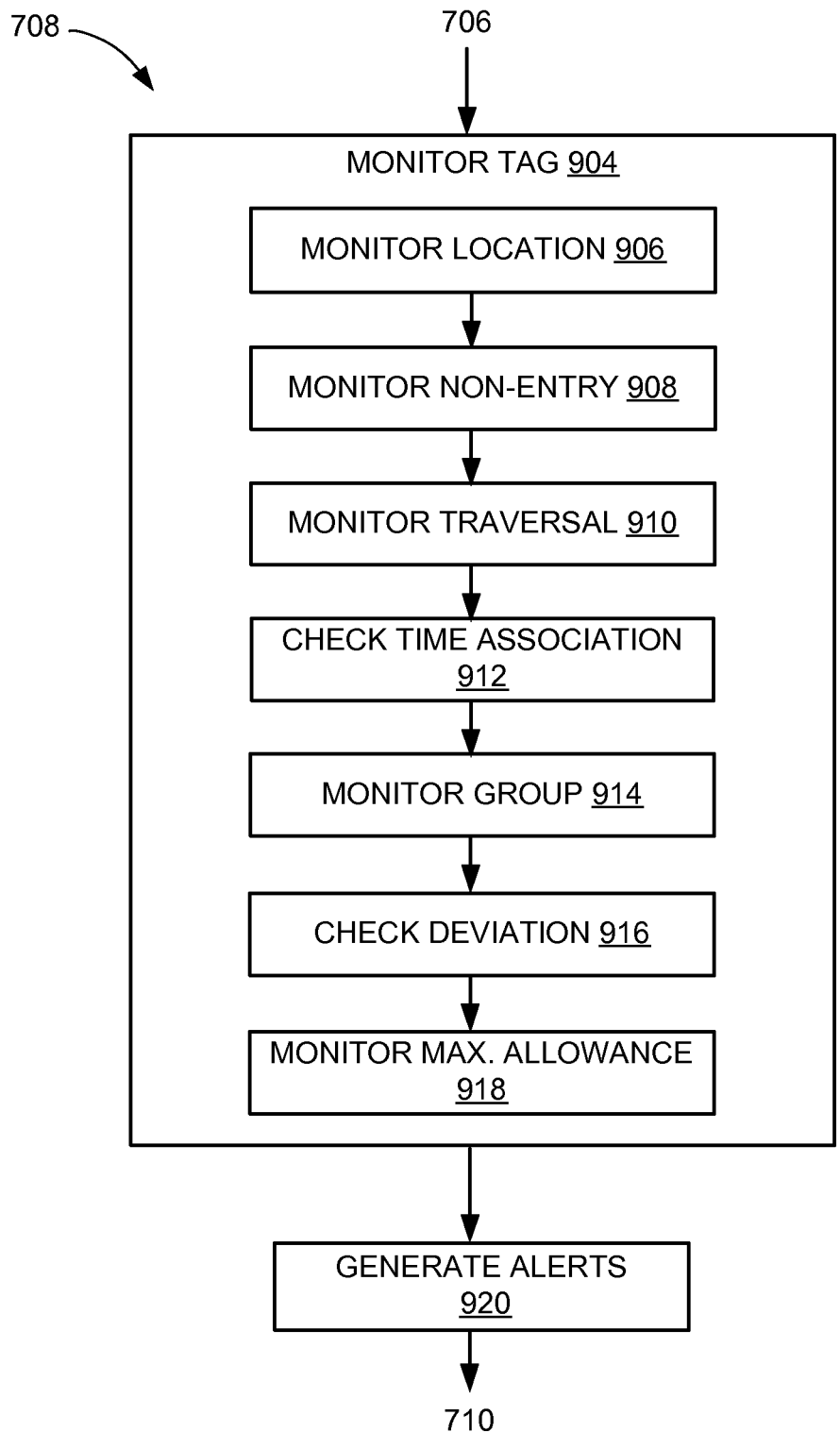
FIG. 9 is a detailed view of the monitoring module.

Referring now to FIG. 9, therein is shown a detailed view of the monitoring module 708. The monitoring module 708 can include a monitor tag module 904 and a generate alert module 920.

The monitor tag module 904 can monitor and track the first tracking tag 208 of FIG. 2 and the second tracking tag 210 of FIG. 2. The monitor tag module 904 can include a monitor location module 906, a monitor non-entry module 908, a monitor traversal module 910, a check time association module 912, a monitor group module 914, a check deviation module 916, and a monitor maximum allowance module 918.

The monitor tag module 904 can also track the group membership 402 of FIG. 4 and the group association 404 of FIG. 4. The monitor tag module 904 can monitor the monitored boundary 206 of FIG. 2 and the deviation boundary 302 of FIG. 3. The monitor tag module 904 can also instruct the generate alert module 920 to generate the alert 212 of FIG. 2.

The monitor tag module 904 can use the control unit 508 of FIG. 5 to monitor the first tracking tag 208, the second tracking tag 210, the group membership 402, the group association 404, the monitored boundary 206, and the deviation boundary 302. The monitor tag module 904 can also use the first control unit 612 of FIG. 6 to monitor the first tracking tag 208, the second tracking tag 210, the group membership 402, the group association 404, the monitored boundary 206, and the deviation boundary 302. The monitor tag module 904 can be coupled to the generate alert module 920.

The monitor location module 906 can monitor and locate the monitored person's location 408 of FIG. 4. The monitor location module 906 can also calculate the distance from the monitored person's location 408 to the monitored boundary 206, the group association 404, and the deviation boundary 302.

The monitor location module 906 can use the control unit 508 to calculate the monitored person's location 408. The monitor location module 906 can use the control unit 508 to calculate the distance of the monitored person's location 408 from the monitored boundary 206, the group association 404, and the deviation boundary 302. The monitor location module 906 can also use the first control unit 612 to calculate the monitored person's location 408. The monitor location module 906 can use the first control unit 612 to calculate the distance of the monitored person's location 408 from the monitored boundary 206, the group association 404, and the deviation boundary 302.

The monitor non-entry module 908 can monitor and detect the non-entry 220 of FIG. 2. The monitor non-entry module 908 can check the expected time 216 of FIG. 2 and the monitored person's location 408 to determine the non-entry 220. If the monitor non-entry module 908 can detect the non-entry 220, then the alert 212 of FIG. 2 can be generated. The monitor non-entry module 908 can use the control unit 508 to monitor the expected time 216 with the monitored person's location 408. The monitor non-entry module 908 can also use the first control unit 612 to monitor the expected time 216 with the monitored person's location 408.

It has been discovered that the present invention provides a navigation system with monitoring mechanism for monitoring a non-entry. The monitoring of a non-entry provides a way to keep track of and enforce a monitored person's behavior such as enforcing a curfew or knowing if the monitored person reached a destination on time. The monitoring of a non-entry can assist in supervising a monitored person for safety and security purposes.

The monitor traversal module 910 can monitor and detect the monitored person's traversal 222 of FIG. 2 from the monitored boundary 206. The monitor traversal module 910 can also monitor and detect the monitored person's exit traversal 306 of FIG. 3. The monitor traversal module 910 can monitor when the first tracking tag 208 enters into or exits the monitored boundary 206. The monitor traversal module 910 can use the control unit 508 to monitor the monitored person's traversal 222. The monitor traversal module 910 can also use the first control unit 612 to monitor the monitored person's traversal 222.

The check time association module 912 can compare the time association 214 of FIG. 4 to the monitored person's location 408, the monitored person's traversal 222, the monitored boundary 206, and the deviation boundary 302. The check time association module 912 can detect if the time association 214 has been exceeded for generating the alert 212. For example, the check time association module 912 can monitor if the traversal timer 304 of FIG. 3 from the monitored boundary 206 meets or exceeds the timer maximum 308 of FIG. 3.

The check time association module 912 can use the control unit 508 to check the time association 214 with the monitored person's location 408, the monitored person's traversal 222, the monitored boundary 206, and the deviation boundary 302. The check time association module 912 can also use the first control unit 612 to check the time association 214 with the monitored person's location 408, the monitored person's traversal 222, the monitored boundary 206, and the deviation boundary 302.

The monitor group module 914 can monitor the group association 404, the group membership 402, and the group distance 406. The monitor group module 914 can monitor if the monitored person's location 408 exceeds the group distance 406 from the group association 404. If the monitored person's location 408 exceeds the group distance 406, the monitor group module 914 can trigger the alert 212.

The monitor group module 914 can also monitor if the monitored person's location 408 is within the group distance 406. If the monitored person's location 408 is within the group distance 406, the monitor group module 914 can also trigger the alert 212. The monitor group module 914 can use the control unit 508 to monitor the monitored person's location 408 with the group distance 406. The monitor group module 914 can also use the first control unit 612 to monitor the monitored person's location 408 with the group distance 406.

It has also been discovered that the present invention provides a navigation system with monitoring mechanism for monitoring a group association. The group association can provide multiple options for monitoring the monitored person, such as group association of social events, parties, team events, and gatherings. A group membership can be assigned to people or party members and the group membership can form the group association. The generating of an alert can be based on the group association. The alert can be generated when the group association disbands. The alert can also be generated based on the monitored person's location and the group distance from the group association.

The check deviation module 916 can monitor the deviation boundary 302 and the deviation time limit 310. The check deviation module 916 can monitor if the first tracking tag 208 leaves the deviation boundary 302. If the first tracking tag 208 leaves the deviation boundary, the check deviation module 916 can trigger the alert 212.

The check deviation module 916 can check and recheck the deviation time limit 310 if the first tracking tag 208 enters and exits the deviation boundary 302 many times. If the first tracking tag 208 remains inside the deviation boundary 302 beyond the deviation time limit 310, the check deviation module 916 can trigger the alert 212.

The check deviation module 916 can use the control unit 508 to monitor the deviation boundary 302 and the deviation time limit 310. The check deviation module 916 can also use the first control unit 612 to monitor the deviation boundary 302 and the deviation time limit 310.

It has further been discovered that the present invention provides a navigation system with monitoring mechanism for monitoring a deviation boundary and a deviation time limit. The deviation boundary can provide an additional monitored boundary with a different set of criteria for generating the alert. If the monitored person enters into the deviation boundary, the deviation time limit can control when the alert is generated. The deviation boundary and deviation time limit can provide added flexibility in generating the alert to account for short trips out of the monitored boundary.

The monitor maximum allowance module 918 can monitor the allowance count 412 of FIG. 4 with the maximum allowance 410 of FIG. 4. The monitor maximum allowance module 918 can track and update the allowance count 412. If the allowance count 412 meets or exceeds the maximum allowance 410, the monitor maximum module 918 can trigger the alert 212.

For example, the monitor maximum allowance module 918 can allow the monitored person's traversal 222 of the monitored boundary 206 to occur four times before triggering the alert 212. If the monitor maximum allowance module 918 detects the monitored person's traversal 222 of the monitored boundary 206, the monitor maximum allowance module 918 can update the allowance count 412. If the allowance count 412 meets or exceeds the maximum allowance 410, the monitor maximum allowance module 918 can trigger the alert 212.

The monitor maximum allowance module 918 can use the control unit 508 to monitor the allowance count 412. The monitor maximum allowance module 918 can also use the first control unit 612 to monitor the allowance count 412.

It has yet further been discovered that the present invention provides a navigation system with monitoring mechanism of a maximum allowance. The maximum allowance can provide additional options in monitoring a monitored person such as giving a monitored person permission to cross a monitored boundary a pre-determined amount of times. The maximum allowance can be associated with a monitored threshold to provide alerts when a maximum number of a monitored threshold is reached. The maximum allowance can be a maximum amount of events that occur within a time period before an alert is generated. The maximum allowance can be reset based on time, such as hours, days, months, and years.

The generate alert module 920 can generate the alert 212. The generate alert module can receive instructions from the monitor tag module 904 for generating the alert 212. For example, if the monitored boundary 206, the monitored threshold 218, the time association 214, the deviation boundary 302, the group association 404, or combination thereof is violated, the monitor tag module 904 can instruct the generate alert module 920 to generate the alert 212. The generate alert module 920 can generate the alert 212 on the display interface 202 of FIG. 2. The generate alert module 920 can also generate the alert 212 on the first display interface 630 of FIG. 6.

The monitor location module 906 can be coupled to the monitor non-entry module 908. The monitor non-entry module 908 can be coupled to the monitor traversal module 910. The monitor traversal module 910 can be coupled to the check time association module 912. The check time association module 912 can be coupled to the monitor group module 914. The monitor group module 914 can be coupled to the check deviation module 916. The check deviation module 916 can be coupled to the monitor maximum allowance module 918.

For illustrative purposes, the modules of the monitoring module 708 are described as discrete functional modules, although it is understood that these modules can have a different configuration. For example, the monitor tag module 904, the monitor non-entry module 908, the monitor traversal module 910, the check time association module 912, the check deviation module 916, and the generate alert module 920 may not be discrete functional modules but may have one or more of the aforementioned modules combined into one functional module.

It has still further been discovered that the present invention provides a navigation system with monitoring mechanism for monitoring a monitored person with stationary or non-stationary boundaries, time, occurrences, and deviations. The navigation can provide many options and criteria in monitoring a monitored person to reduce the amount of false alerts and to provide alerts that are desired. The navigation system can monitor if the monitored person is inside or outside of the monitored boundary by the expected time. The navigation system can monitor a traversal timer and check the traversal timer against the timer maximum.

The physical transformation of the monitored boundary 206, the monitored person's traversal 222 of FIG. 2, the group association 404 of FIG. 4, the deviation boundary 302 of FIG. 4, and the alert 212 results in movement and changes of the monitored person behavior in the physical world, such as people using the first device 102 of FIG. 1 or vehicles, based on the operation of the navigation system 700. As the movement and modified behavior in the physical world occurs, the movement itself creates additional information that is converted back to the monitored boundary 206, the monitored person's traversal 222, the group association 404, and the deviation boundary 302 for the operation of the navigation system 700 of FIG. 7 and to continue the movement in the physical world.

Figure 10:
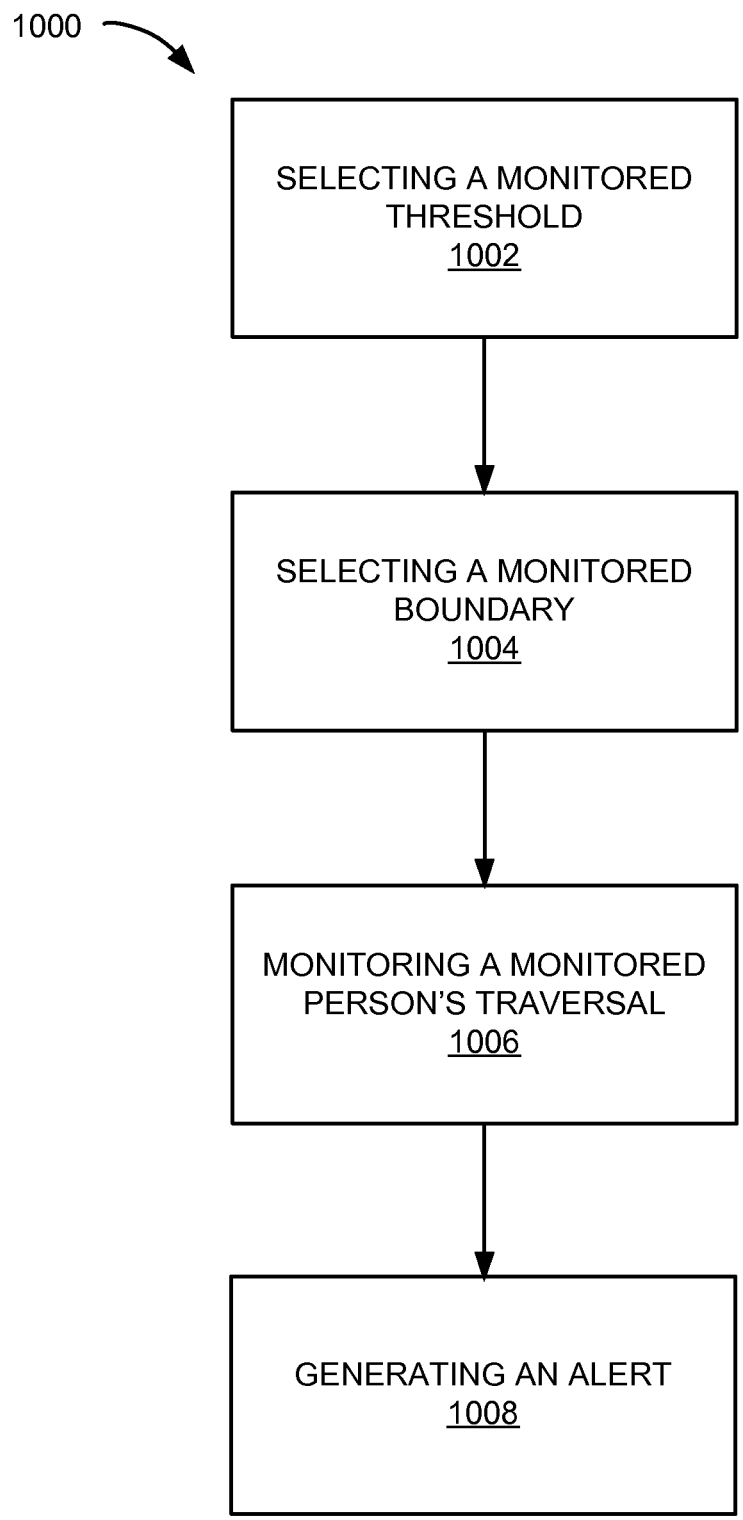
FIG. 10 is a flow chart of a method of operation of a navigation system in a further embodiment of the present invention.

Referring now to FIG. 10, therein is shown a flow chart of a method 1000 of operation of a navigation system 100 in a further embodiment of the present invention. The method 1000 includes: selecting a monitored threshold in a block 1002; selecting a monitored boundary in a block 1004; monitoring a monitored person's traversal of the monitored boundary in a block 1006; and generating an alert based on the monitored person's traversal and the monitored threshold for displaying on a device on a block 1008.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   selecting a monitored threshold including a group association;
   selecting a monitored boundary;
   monitoring a monitored person's traversal of the monitored boundary; and
   generating an alert based on the monitored person's traversal and the monitored threshold for displaying on a device.

2. The method as claimed in claim 1 further comprising:
   selecting an expected time of a time association; wherein:
   monitoring the monitored person's traversal of the monitored boundary includes monitoring a non-entry into the monitored boundary by the expected time; and
   generating the alert based on the monitored person's traversal and the monitored threshold includes generating the alert based on the non-entry.

3. The method as claimed in claim 1 further comprising:
   selecting a group distance from the group association; and
   wherein generating the alert based on the monitored threshold includes generating the alert with a monitored person's location beyond the group distance.

4. The method as claimed in claim 1 further comprising:
   monitoring a traversal timer;
   selecting a timer maximum outside the monitored boundary; and
   wherein generating the alert based on the monitored threshold includes generating the alert with the traversal timer meeting or exceeding the timer maximum.

5. The method as claimed in claim 1 further comprising:
   selecting a deviation boundary beyond the monitored boundary;
   selecting a deviation time limit;
   monitoring a traversal timer; and
   wherein generating the alert based on the monitored person's traversal includes:
   monitoring the monitored person's traversal of the deviation boundary with the traversal timer meeting or exceeding the deviation time limit.

6. A method of operation of a navigation system comprising:
   selecting a monitored threshold including a group association;
   selecting an expected time, a timer maximum, a deviation time limit, or a combination thereof;
   selecting a monitored boundary, a deviation boundary, or combination thereof;
   monitoring a monitored person's traversal of the monitored boundary; and
   generating an alert with the monitored person's traversal exceeding the monitored threshold and the monitored boundary, the deviation boundary, or combination thereof.

7. The method as claim in claim 6 further comprising:
   selecting a group distance from the group association;
   monitoring a monitored person's location within the group distance from the group association; and
   wherein generating the alert with the monitored person's traversal exceeding the monitored threshold includes generating the alert with the monitored person's location beyond the group distance from the group association.

8. The method as claimed in claim 6 wherein selecting the monitored boundary includes selecting the monitored boundary, the monitored boundary is non-stationary.

9. The method as claimed in claim 6 wherein:
   monitoring the monitored person's traversal includes monitoring a monitored person's exit traversal of the deviation boundary; and
   generating the alert includes generating the alert with the monitored person's exit traversal of the deviation boundary.

10. The method as claimed in claim 6 further comprising:
    selecting a maximum allowance associated with the monitored threshold, the monitored boundary, or combination thereof;
    monitoring an allowance count; and
    generating the alert with the allowance count meeting or exceeding the maximum allowance.

11. A navigation system comprising:
    a user interface for selecting a monitored threshold including a group association;
    a boundary module, coupled to the user interface, for selecting a monitored boundary;
    a monitoring module, coupled to the boundary module, for monitoring a monitored person's traversal of the monitored boundary; and
    a generate alert module, coupled to the monitoring module, for generating an alert based on the monitored person's traversal and the monitored threshold for displaying on a device.

12. The system as claimed in claim 11 further comprising:
    an expected time module for selecting an expected time of a time association;
    a monitor tag module, coupled to the expected time module, for monitoring a non-entry into the monitored boundary by the expected time; and
    wherein:
    the generate alert module, coupled to the monitor tag module, is for generating the alert based on the monitored person's traversal and the monitored threshold includes generating the alert based on the non-entry.

13. The system as claimed in claim 11 further comprising;
    a threshold module, coupled to the boundary module, for selecting the group association as the monitored threshold;
    a group association module, coupled to the threshold module, for selecting a group distance from the group association; and
    wherein:
    the generate alert module, coupled to the group association module, is for generating the alert with a monitored person's location beyond the group distance.

14. The system as claimed in claim 11 further comprising:
    a threshold module, coupled to the monitoring module, for selecting a timer maximum outside the monitored boundary; and
    wherein:
    the monitoring module includes:
    a monitor traversal module for monitoring a traversal timer; and
    the generate alert module, coupled to the threshold module, is for generating the alert with the traversal timer meeting or exceeding the timer maximum.

15. The system as claimed in claim 11 further comprising:
a deviation boundary module for selecting a deviation boundary beyond the monitored boundary;
a deviation time limit module, coupled to the deviation boundary module, for selecting a deviation time limit; and
wherein:
the monitoring module includes:
- a monitor traversal module for monitoring a traversal timer, and
- a check deviation module, coupled to the monitor traversal module, for monitoring the monitored person's traversal of the deviation boundary; and the generate alert module is for generating the alert with the traversal timer meeting or exceeding the deviation time limit.

16. The system as claimed in claim 11 further comprising:
a time association module, coupled to the monitoring module, for selecting an expected time, a timer maximum, a deviation time limit, or a combination thereof; and
wherein:
the monitoring module includes:
- a monitor traversal module for monitoring the monitored person's traversal of the monitored boundary;

the boundary module, coupled to the monitor traversal module, is for selecting a monitored boundary, a deviation boundary, or combination thereof; and
the generate alert module, couple to the boundary module, is for generating the alert with the monitored person's traversal exceeds the monitored threshold and the monitored boundary, the deviation boundary, or combination thereof.

17. The system as claim in claim 16 further comprising:
a group association module, for selecting a group distance from the group association; and
wherein:
the monitoring module, is for monitoring that the monitored person's location is within the group distance from the group association; and
the generate alert module is for generating the alert with the monitored person's location beyond the group distance from the group association.

18. The system as claimed in claim 16 wherein the boundary module is for selecting the monitored boundary, the monitored boundary is non-stationary.

19. The system as claimed in claim 16 wherein:
the monitoring module is for monitoring the monitored person's exit traversal of the deviation boundary; and
the generate alert module is for generating the alert for the monitored person's exit traversal of the deviation boundary.

20. The system as claimed in claim 16 further comprising:
a maximum allowance module, coupled to the monitoring module, for selecting a maximum allowance on the monitored threshold, the monitored boundary, or combination thereof;
a monitor maximum allowance module, couple to the maximum allowance module, for monitoring the allowance count; and
wherein:
the generate alert module is for generating the alert with the allowance count meeting or exceeding the maximum allowance.

* * * * *